US006603759B1

United States Patent
Moskal et al.

(10) Patent No.: US 6,603,759 B1
(45) Date of Patent: Aug. 5, 2003

(54) ADAPTIVE BUFFER MANAGEMENT FOR VOICE OVER PACKET NETWORK

(75) Inventors: Andre Moskal, Kanata (CA); Andre Diorio, Toronto (CA)

(73) Assignee: Zarlink Semiconductor Inc. (CA)

( * ) Notice: Subject to any disclaimer, the term of this patent is extended or adjusted under 35 U.S.C. 154(b) by 0 days.

(21) Appl. No.: 09/432,540

(22) Filed: Nov. 3, 1999

(51) Int. Cl.[7] ................................................ H04L 12/66
(52) U.S. Cl. ...................... 370/352; 370/412; 370/428; 370/467
(58) Field of Search ................................ 370/230, 231, 370/235, 352, 356, 412, 428, 429, 465, 466, 467

(56) References Cited

U.S. PATENT DOCUMENTS 6,052,375 A    4/2000  Bass et al. ................. 370/412
6,173,044 B1   1/2001  Hortensius et al. ........ 379/93.09
6,215,858 B1   4/2001  Bartholomew et al. .... 379/88.17
6,219,339 B1   4/2001  Doshi et al. ................ 370/235
6,272,633 B1   8/2001  Duke et al. ................. 713/171
6,430,175 B1   8/2002  Echols et al. ............... 370/352
6,449,251 B1   9/2002  Awadullah et al. ......... 370/229

*Primary Examiner*—Alpus H. Hsu
*Assistant Examiner*—Roberta Stevens
(74) *Attorney, Agent, or Firm*—Jones Day

(57) ABSTRACT

A system is provided for carrying synchronous voice payloads of variable size across a packet-based network while eliminating network jitter losses. According to the preferred embodiment, two concurrent tasks are implemented. A Voice Packet Processing task receives packetized voice from a packet oriented interface, processes headers of the packet, and builds a receive payload buffer that is managed by means of copying packets to the synchronous interface according to the contents of the payload buffer. The Voice Packet Forwarding task builds a transmit payload buffer for voice samples received from the synchronous interface, builds the necessary protocol headers and forwards the packet to the packet oriented interface.

5 Claims, 5 Drawing Sheets

ADAPTIVE BUFFER MANAGEMENT FOR VOICE OVER PACKET NETWORK

FIELD OF THE INVENTION

This invention relates in general to data transfer systems and more specifically to an apparatus and method for avoiding jitter and variations in payload size for a voice over packet network.

BACKGROUND OF THE INVENTION

Traditional voice networks are based on 64 kbit/s synchronous transfer mode channels. Recently, new methods utilizing packet-based networks have emerged for transmitting voice. Carrying voice over a packet-based network introduces a number of problems such as jitter, various payload sizes, and lack of unified Quality of Service.

The usual method for transmitting G.711 (64 kbit/s) based payloads across a packet based network, such as an Internet Protocol (IP) network, is via compression technology (e.g. G.723/G.729) in order to optimize bandwidth utilization over the Internet. Some prior art methods address the problem of variable payloads by using de-jitter buffers, however, most of these methods are based on single voice channel streaming. One such product is the NetMeeting™ application by Microsoft Corporation.

SUMMARY OF THE INVENTION

According to the present invention, a system is provided for carrying G.711 (64 kbit/s) based voice payloads across a packet-based network while overcoming the problems of network jitter and variable payload size.

More particularly, two concurrent tasks are implemented according to the invention, as follows: a Voice Packet Processing task and a Voice Packet Forwarding task. The Voice Packet Processing task receives packetized voice from a packet oriented interface, processes headers of the packet, and builds a payload buffer that is managed as described in greater detail below. The Voice Packet Forwarding task builds a payload buffer from the G.711 voice samples received from the synchronous interface, builds the necessary protocol headers and forwards the packet to the packet oriented interface.

BRIEF DESCRIPTION OF THE DRAWINGS

A preferred embodiment of the present invention is described herein below with reference to the drawings in which.

DETAILED DESCRIPTION OF THE PREFERRED EMBODIMENT

Figure 1:
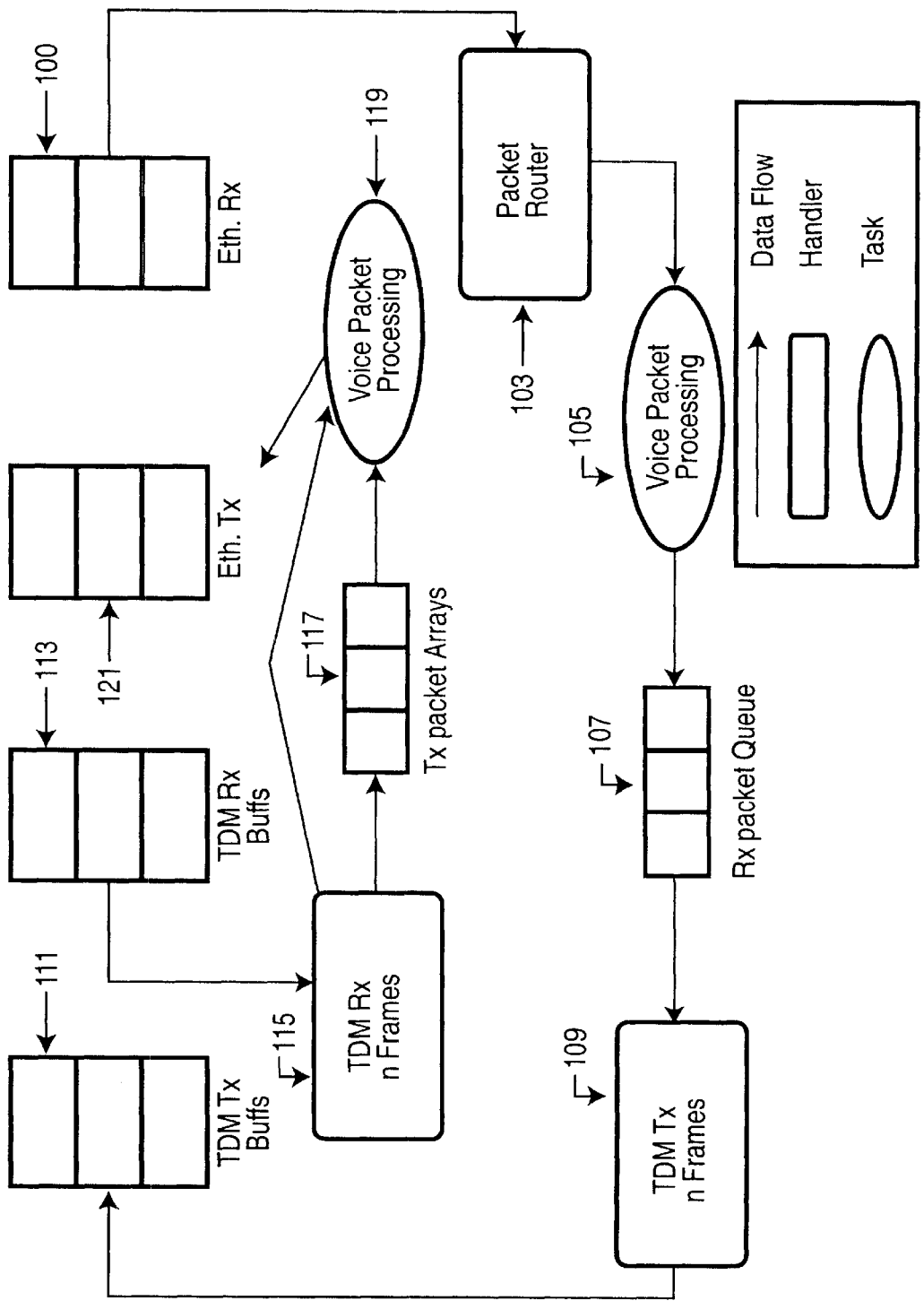
FIG. 1 is a block diagram illustrating the functionality and interaction of software components according to the preferred embodiment.
Figure 2:
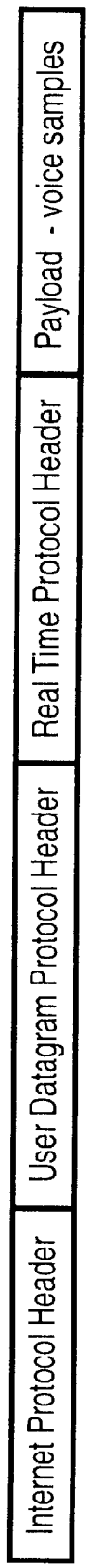
FIG. 2 shows the structure of a voice packet according to the well-known Internet Protocol.

FIG. 1 shows the basic architecture of an adaptive voice packet management system according to the preferred embodiment, for sending and receiving voice packets which conform to the well known Internet Protocol shown in FIG. 2.

Incoming packets are queued at an Ethernet Rx queue 100 and compared via a Packet Router 103 with IP (Internet Protocol) destination addresses and User Datagram Protocol destination ports of a plurality of Internet Protocol datagram entries in a discrimination table 102.

Each discrimination table entry is programmed by a Connection Control task 104 during the establishment of a Voice-over Internet Protocol (VOIP) session for each specified Internet Protocol address and User Datagram Protocol port. The Connection Control task 104 communicates with the entity handling call signaling (e.g. a call processing software agent), either within the same subsystem or on other nodes. The entity handling call signaling provides to the Connection Control task 104 connect or disconnect messages containing the Internet Protocol address and User Datagram Protocol port of the voice session being established/disconnected by the call signaling entity. The Connection Control task 104, upon reception of a connect message, enters the Internet Protocol address, TDM channel number of the voice session and the User Datagram Protocol port for the incoming channel into the discrimination table 102. The TDM channel number, packet size, and IP address, UDP port information for the outgoing channel are stored in a Tx packet table 106. Thus, although the type of information stored in tables 102 and 106 is the same, the content is different. This separation of data makes it easier to support half duplex operations when necessary.

Upon the reception of disconnect message the entry, the Internet Protocol address and User Datagram Protocol port for the VOIP session is removed from the discrimination table 102 and TX packet table 106. The size of the payload in the voice packets is also programmed by the Connection Control task 104 based on information received on a per-channel basis from the call signaling entity.

The following pseudo-code sets forth operation of the Connection Control task 104:

```
Connection Control Task( ) {
    Initialize Tx Packet Table
    Initialize Discriminator Table
    Loop forever {
        Receive call signaling message
        If message == connect {
            Parse remainder of the message
            Program channel entry in Tx Packet Table
            Program channel entry in Discrimination Table
            Build IP and UDP headers in channel's packet arrays
        } else if message == disconnect {
            Parse remainder of the message
            Remove channel entry from TX Packet Table
            Remove channel entry from Discrimination Table
        } else if message == unknown {
            Handle unknown message
        } /* end if message */
    } /* end loop forever */
} /* end Connection Control Task */
```

The Packet Router 103 identifies voice packets by means of comparing the destination address in the IP header and the port number in the User Datagram Protocol header of the incoming packet to the entries in the discrimination table 102. If the entry in the discrimination table matches the Internet Protocol address and User Datagram Protocol of the incoming packet, then the packet is forwarded to a Voice Processing Task 105.

The following pseudo-code sets forth operation of the Packet Router 103:

```
Packet_router_handler( ) {
    Get Ethernet interrupt status
    if (interrupt == receive) {
        Compare IP Address/UDP Port to the content of discrimination
        table
            if incoming packet is voice {
                Update Ethernet layer's receive buffer pointers
                Flag receive buffer as used
                Add a tag byte indicating TDM channels to the buffer
                Forward receive buffer to voice packet processing task
            } else { /* received packet is data: call kernel's handler */
                Call Ethernet handler
            } /* endif incoming packet is voice? */
    } else { /* it is not transmit interrupt */
        Call Ethernet handler
    } /* endif receive interrupt? */
} /* end Packet_router_handler( ) */
```

Voice Packet Processing task 105 removes the headers from the packet and builds a contiguous buffer for each session, identified in FIG. 1 as Rx Packet Queue 107. The Voice Packet Processing task 105 also handles jitter and lost packets by building a per-channel state machine that compensates for buffer underflow or overflow.

The following pseudo-code sets forth operation of the Voice Packet Processing task 105:

```
Voice Packet Processing Task( ) {
    Initialize state machine
    While mode NOT disconnecting
        Wait for receive msg from packet router handler
        Extract TDM channel number from the discrimination table
        Queue voice packet in specified channel's FIFO queue
        /* Update channel state */
        old_channel_state = channel_state
        if ( voice data queued > MAX_VOICE_DATA_QUEUED ) {
            channel_state = VOICE_Q_OVERFLOW
        } else if (voice data queued == UNDERFLOW)
            channel_state = VOICE_Q_UNDERFLOW
        } else if ( voice data queued < LOW_WATER_MARK ) {
            channel_state = VOICE_Q_STARVATION
        } else if ( voice data queued > HIGH_WATER_MARK ) {
            channel_state = VOICE_Q_BUILDUP
        } else {
            channel_state = VOICE_Q_OK
        } /* endif beyond high watermark */
    End while
    Buffer Cleanup
} /* End Voice Packet Processing Task */
```

Figure 3A:
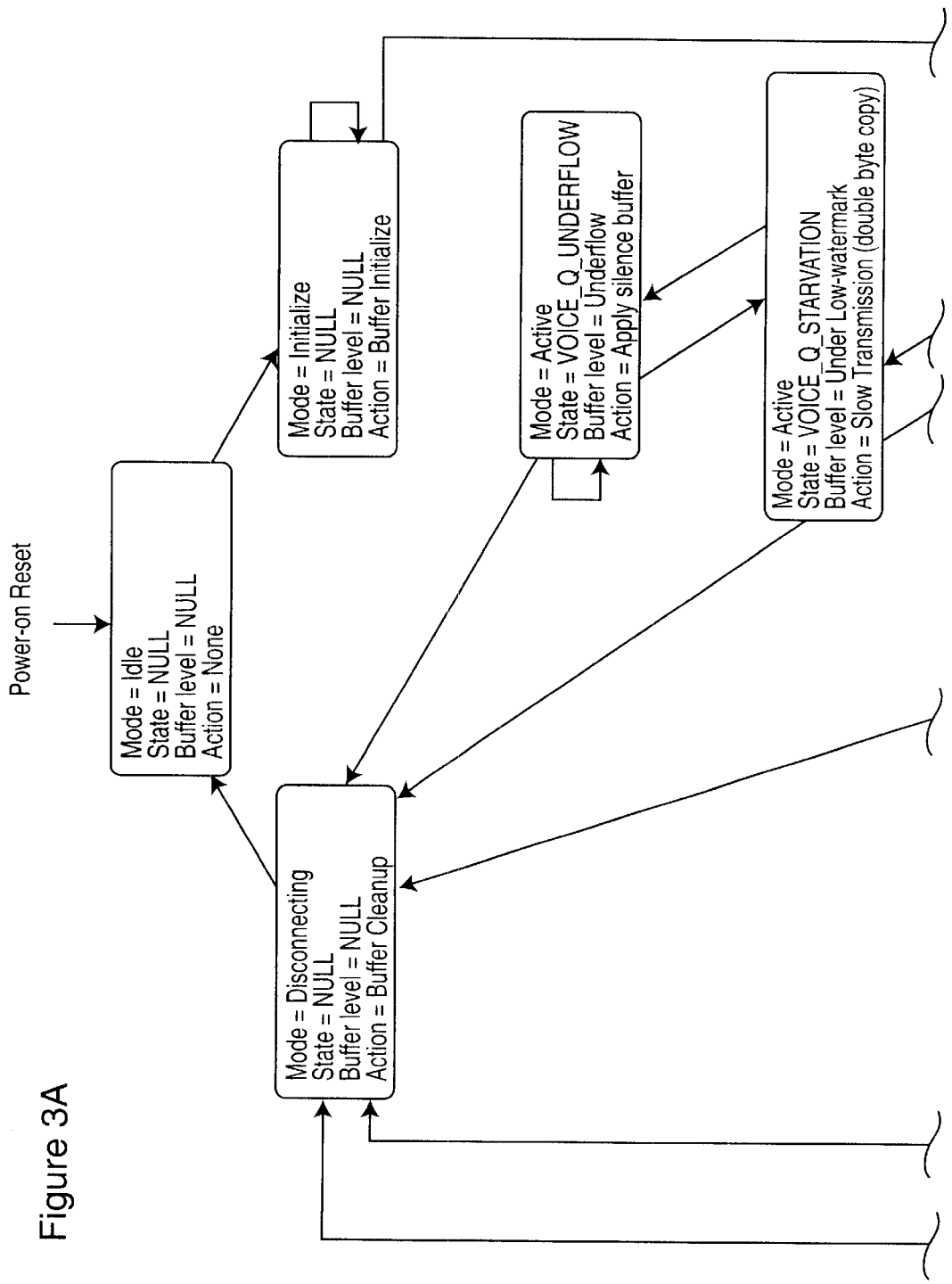
FIG. 3 is a diagrammatic representation of a state machine created by a voice processing task according to the present invention.
Figure 3B:
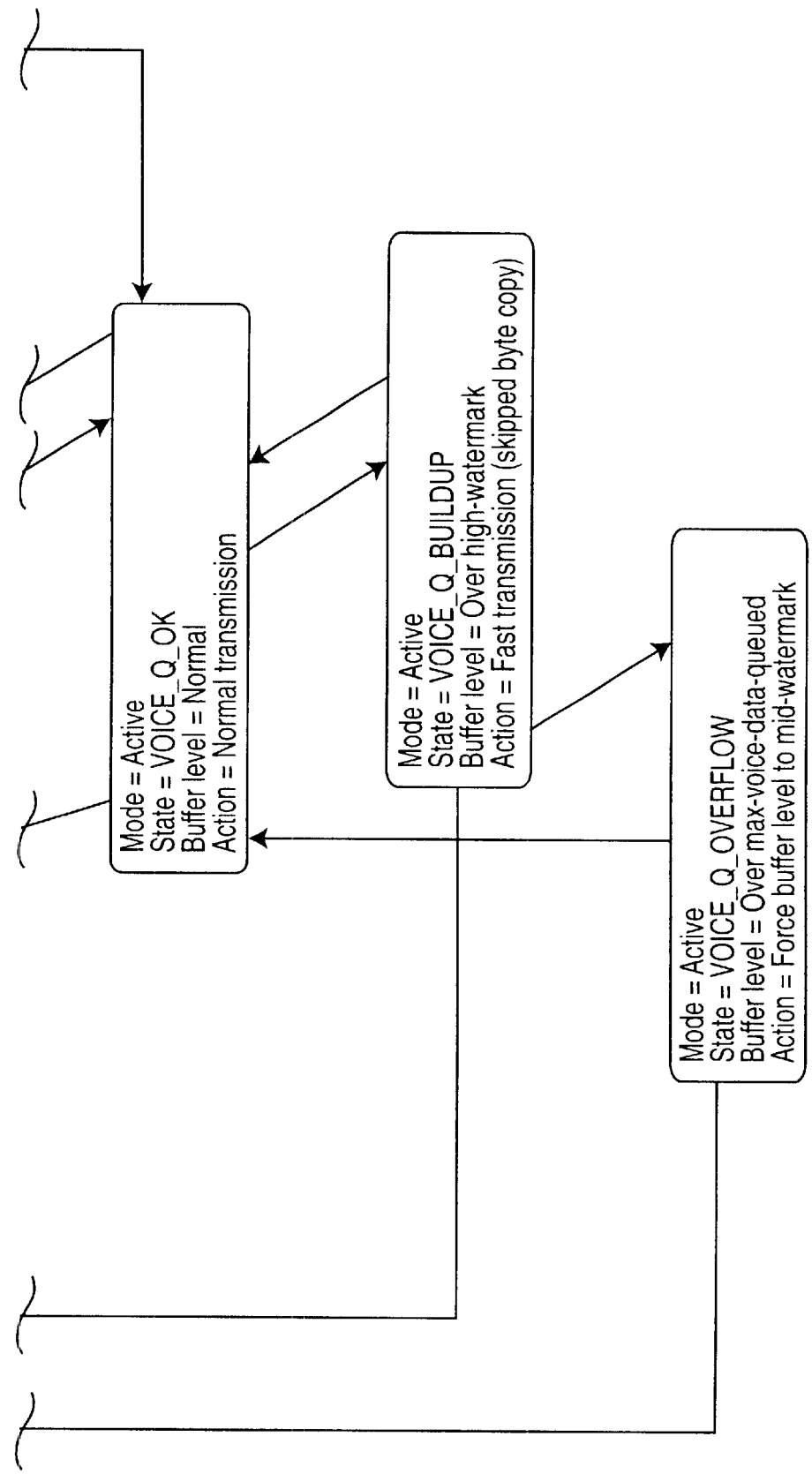
Figure 4:
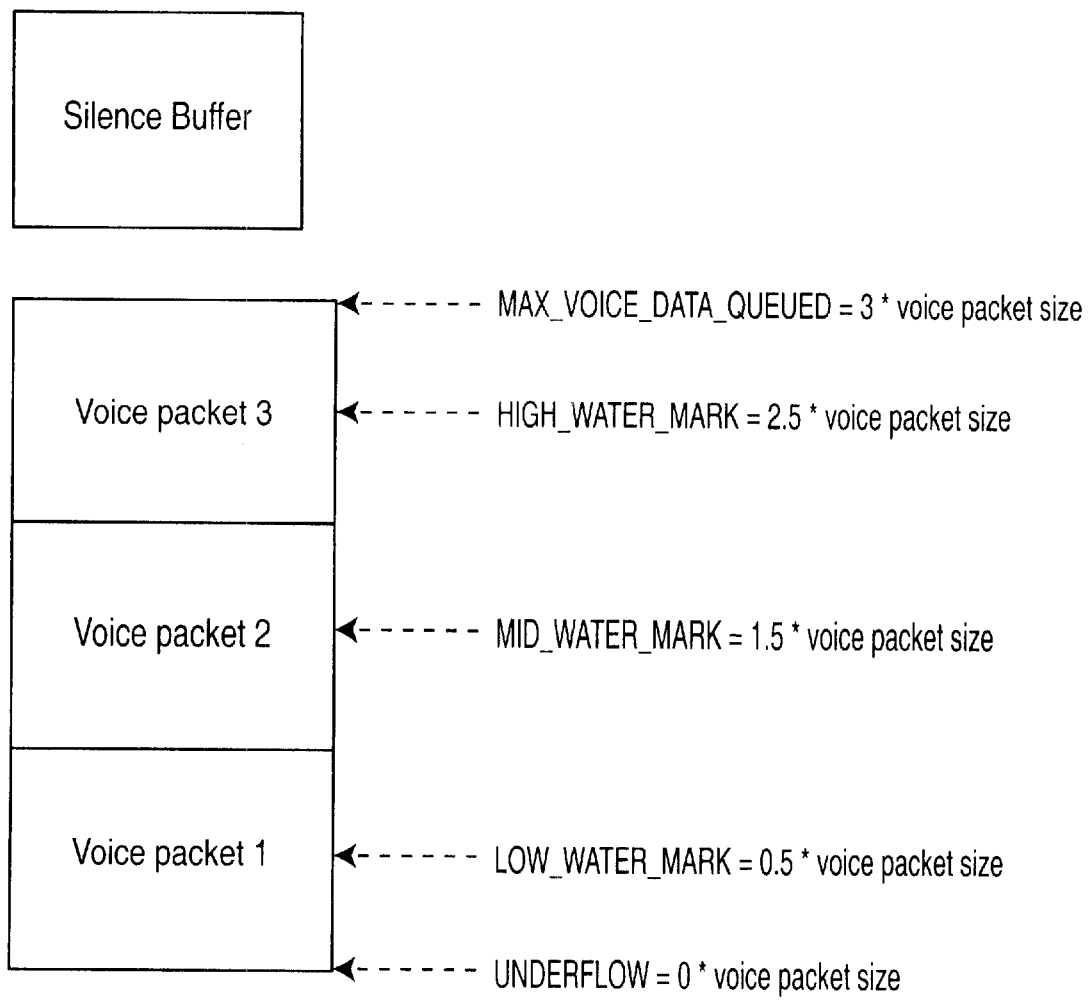
FIG. 4 shows threshold levels used by the voice processing task according to the preferred embodiment.

The state diagram of FIG. 3 is implemented in TDM Transmit Frame handler 109, which monitors five threshold levels for each received buffer 107, as shown in FIG. 4. The TDM Transmit Frame Handler 109 copies the voice packets in buffers 107 to the appropriate TDM Tx Frames in the TDM Tx Buffers 111. The TDM Transmit Frame handler 109 is called every n frames, where n is a preset number of frames. The TDM transmit buffer size determines when an interrupt will be generated. The TDM Transmit Frame handler 109 scans all TDM channels and fills the TDM Transmit buffers 111 with queued packetized voice data. As shown in FIG. 3, the TDM Transmit Frame handler 109 also updates the number of pending voice bytes and checks for a voice data underflow and overflow conditions.

The following pseudo-code sets forth operation of the TDM Transmit Frame Handler 109:

```
TDM Transmit Frame handler {
    For each TDM channel {
        /* Fill TDM Transmit buffers */
        fill_tdm_out_buffers( channel_handle ) {
            if (outgoing TDM frame buffers[channel_num] free size > MIN_TRANSFER_SIZE) {
                dequeue oldest voice packet from channel's FIFO
                if (channel_state == VOICE_Q_OVERFLOW) {
                    increment overflow hit counter
                    if (too many overflow hits) {
                        abort_call ( )
                    } else {
                        /* force buffer level to mid-watermark and resume normal
                        ** transmission
                        */
                        voice_data_queued = MID_WATERMARK
                        Transfer voice data to TDM OUT frame buffers
                        Update voice data queued counter
                    }
                } else if (channel_state == VOICE_Q_BUILDUP) {
                    Transfer voice data to TDM OUT frame buffers
                    /* copy every second byte of voice data to the TDM OUT frame
                    ** buffer and update the pointer to the voice data by two bytes
                    ** for every byte copy
                    */
                    Update voice data queued counter
                } else if (channel_state == VOICE_Q_STARVATION)
                    Transfer voice data to TDM OUT frame buffers
                    /* copy each byte of voice data twice to the TDM OUT frame
                    ** buffers and update pointer to the voice data by one byte
                    ** for every two bytes copied
                    */
                    Update voice data queued counter
                }
```

```
            } else if (channel_state == VOICE_Q_UNDERFLOW) {
                Transfer silence buffer data to TDM OUT frame buffers
            } else if (channel_state == VOICE_Q_OK) {
                Transfer voice data to outgoing TDM frame buffers
                Update voice data queued counter
            } else
                /* state in non Active mode on the buffer */
                handle active state error
            } /* endif channel state? */
        /* Update channel state */
        old_channel_state = channel_state
        if ( voice data queued > MAX_VOICE_DATA_QUEUED ) {
            channel_state = VOICE_Q_OVERFLOW
        } else if (voice data queued == UNDERFLOW)
            channel_state = VOICE_Q_UNDERFLOW
        } else if ( voice data queued < LOW_WATER_MARK ) {
            channel_state = VOICE_Q_STARVATION
        } else if ( voice data queued > HIGH_WATER_MARK ) {
            channel_state = VOICE_Q_BUILDUP
        } else {
            channel_state = VOICE_Q_OK
        } /* endif beyond high watermark */
                /* Free consumed ethernet packet */
                Flag receive buffer as free
            } /* endif free space on outgoing TDM frame buffers */
        } /* End fill_tdm_out_buffers( ) */
    } /* EndFor each TDM channel */
} /* End TDMx Transmit Frame handler */
```

With reference to FIGS. 3 and 4, and the foregoing pseudo-code representing operation of the Transmit Frame Handler 109, the low level threshold (i.e. LOW_WATER_MARK) indicates a content of the Rx Packet Queue 107 above which it is sufficient to transmit to the synchronous (TDM) interface without any additional processing. If the content of the queue 107 falls below the low level threshold then each byte in the queue is duplicated during the copy of G.711 voice format samples to the TDM Tx buffer 111 until the content of the Rx Packet Queue 107 is restored to above the low level threshold. A consequence of using this method is a change in the frequency of the voice (decreased by factor of 2 in this case).

The high level threshold (i.e. HIGH_WATER_MARK) indicates a content of the queue 107 below which it is sufficient to transmit to the synchronous (TDM) interface without any additional processing. If the content of the queue rises above the high level threshold then every second byte in the queue is removed during the copy of G.711 voice format samples to the TDM Tx buffer 111 until the content of the Rx Packet Queue 107 is reduced to below the high level threshold. A consequence of using this method is a change in the frequency of the voice (increased by factor of 2 in this case).

Incoming voice samples from a synchronous interface (TDM) are received by the TDM Receive Frame Handler 115 which receives information on the voice packet size from the Tx Packet Table 106 that was configured by the Connection Control 104 during the call setup, on a per channel basis. The TDM Receive Frame Handler builds packet for each session and if any buffer 117 in the Tx packet array size becomes full, the TDM Receive Frame Handler activates a Voice Packet Forwarding task 119 via mutex, which is the inter-task synchronization mechanism.

The following pseudo-code sets forth operation of the TDM Receive Frame Handler 115:

```
TDM Receive Frame handler {
    For each active TDM channel {
        Transfer voice data to current tx packet array
        If tx packet array full {
            Update tx packet array state to full in Tx Packet Table
            Signal packet forwarding task
            Go to next packet array
    } /* end for each active channel */
} /* End TDMx Receive Frame handler */
```

The Voice Packet Forwarding task 119 scans for any voice packets that are ready to be sent by accessing Tx Packet Table 106, checks for any packet full state in the Tx packet array 117, and if it has a complete packet it passes the appropriate Tx packet to the Ethernet driver 121 for transmission.

The following pseudo-code sets forth operation of the Voice Packet Forwarding task 119:

```
Voice Packet Forwarding Task {
    Loop forever
        For each active TDM channel {
            if (tx packet array indicates packet ready for transmit) {
                Insert packet header information (RTP)
                Forward tx packet to Ethernet Tx Driver
            endif
        } /* End for each active TDM channel */
    } /* end loop forever
} /* End TDMx Receive Frame handler */
```

It will be appreciated that, although a particular embodiment of the invention has been described and illustrated in detail, various changes and modifications may be made. All such changes and modifications may be made without departing from the sphere and scope of the invention as defined by the claims appended hereto.

We claim:

1. In a system for transmitting Ethernet voice packets between a synchronous interface and a packet oriented interface during a voice-over IP session, the improvement comprising:

a packet router for receiving and identifying predetermined ones of said Ethernet packets from said packet oriented interface as voice packets;

a voice packet processor for building a buffer queue for temporarily storing said voice packets; and a transmit frame handler for monitoring contents of each said buffer queue and selectively transmitting said voice packets from each said buffer queue to said synchronous interface in accordance with said contents of said buffer queue;

wherein said transmit frame handler implements a state machine for:
   i) forcing the contents of each said buffer queue to a mid_watermark level in the event that said buffer queue has contents in excess of a voice queue overflow level, and thereafter copying the contents of said buffer queue to said synchronous interface;
   ii) copying only every second byte of said voice packets from said buffer queue to said synchronous interface in the event that said buffer queue has contents in excess of a voice queue buildup level which is less than said voice queue overflow level and grater than said mid_watermark level;
   iii) copying each byte of said voice packets from said buffer queue to said synchronous interface twice in the event that said buffer queue has contents less than a voice queue starvation level which is less than said mid_watermark level; and
   iv) transferring silence code to said synchronous interface in the event that said buffer queue has contents less than a voice queue underflow level which is less than said voice queue starvation level.

2. The improvement of claim 1, further comprising a connection controller for storing Internet Protocol addresses and User Datagram Protocol ports for each voice-over IP session into a discrimination table and a transmit packet table.

3. The improvement of claim 2, wherein said packet router includes means for comparing header information of said Ethernet packets with said Internet Protocol addresses and User Datagram Protocol ports stored in said discrimination table and in the event of a match identifying said Ethernet packets as voice packets and forwarding said voice packets to said voice packet processor.

4. The improvement of claim 2, further comprising a receive frame handler for receiving voice samples from said synchronous interface, building a transmit packet for each of said voice samples utilizing said Internet Protocol addresses and User Datagram Protocol ports stored as entries in said transmit packet table, storing each said transmit packet in a respective one of a plurality of transmit packet arrays corresponding to said entries in said transmit packet table, and in the event any one of said transmit packet arrays becomes full then tagging a corresponding one of said entries in said transmit packet table.

5. The improvement of claim 4, further comprising a voice packet forwarder for detecting each said corresponding one of said entries in said transmit packet table which has been tagged and in response passing said transmit packet to said packet oriented interface for transmission.

* * * * *